United States Patent
Qi

(10) Patent No.: US 8,018,323 B2
(45) Date of Patent: Sep. 13, 2011

(54) RFID SENSOR DEVICE BASED ON PULSE-PROCESSING

(76) Inventor: Baohua Qi, Columbus, IN (US)

( * ) Notice: Subject to any disclaimer, the term of this patent is extended or adjusted under 35 U.S.C. 154(b) by 1154 days.

(21) Appl. No.: 11/699,232

(22) Filed: Jan. 27, 2007

(65) Prior Publication Data

US 2007/0182549 A1    Aug. 9, 2007

(51) Int. Cl.
*H04Q 5/22* (2006.01)
(52) U.S. Cl. ............ 340/10.4; 340/10.1; 340/10.3; 340/445; 340/539.26; 340/572.1; 380/37
(58) Field of Classification Search ............ 340/539.26, 340/572.1, 539.1
See application file for complete search history.

(56) References Cited

U.S. PATENT DOCUMENTS

| | | | | |
|---|---|---|---|---|
| 3,029,310 A * | 4/1962 | Heiser | ............ | 370/430 |
| 3,775,751 A * | 11/1973 | Anderson | ............ | 370/465 |
| 3,864,578 A * | 2/1975 | Lackey | ............ | 307/10.1 |
| 4,006,477 A * | 2/1977 | Yost et al. | ............ | 342/51 |
| 4,075,632 A * | 2/1978 | Baldwin et al. | ............ | 342/51 |
| 4,241,320 A * | 12/1980 | Fausone et al. | ............ | 333/18 |
| 4,901,351 A * | 2/1990 | Tanaka et al. | ............ | 380/223 |
| 4,916,643 A * | 4/1990 | Ziegler et al. | ............ | 702/188 |
| 4,979,124 A * | 12/1990 | Sachse et al. | ............ | 702/38 |
| 5,335,664 A * | 8/1994 | Nagashima | ............ | 600/508 |
| 5,345,231 A * | 9/1994 | Koo et al. | ............ | 340/870.31 |
| 5,422,930 A * | 6/1995 | McDonald et al. | ............ | 455/411 |
| 5,481,262 A * | 1/1996 | Urbas et al. | ............ | 340/870.17 |
| 5,602,538 A * | 2/1997 | Orthmann et al. | ............ | 340/10.2 |
| 5,661,651 A * | 8/1997 | Geschke et al. | ............ | 701/88 |
| 5,699,066 A * | 12/1997 | Marsh et al. | ............ | 342/44 |
| 5,760,577 A * | 6/1998 | Shizuya | ............ | 324/207.16 |
| 5,777,557 A * | 7/1998 | Fayfield | ............ | 340/635 |
| 5,794,151 A * | 8/1998 | McDonald et al. | ............ | 455/454 |
| 5,831,526 A * | 11/1998 | Hansler et al. | ............ | 340/539.14 |
| 6,044,333 A * | 3/2000 | Stobbe et al. | ............ | 702/106 |
| 6,049,280 A * | 4/2000 | Andersson | ............ | 340/573.3 |
| 6,172,609 B1* | 1/2001 | Lu et al. | ............ | 340/572.4 |
| 6,198,785 B1* | 3/2001 | Flynn | ............ | 375/377 |
| 6,249,212 B1* | 6/2001 | Beigel et al. | ............ | 340/10.34 |
| 6,720,866 B1* | 4/2004 | Sorrells et al. | ............ | 340/10.4 |
| 6,756,856 B2* | 6/2004 | Song et al. | ............ | 331/176 |
| 6,867,686 B1* | 3/2005 | Emmerling et al. | ............ | 340/10.2 |
| 7,006,561 B2* | 2/2006 | Lee | ............ | 375/225 |
| 7,040,139 B2* | 5/2006 | Sunshine | ............ | 73/23.2 |
| 7,199,716 B2* | 4/2007 | Shanks et al. | ............ | 340/572.1 |
| 7,397,370 B2* | 7/2008 | Bratkovski | ............ | 340/539.26 |
| 7,520,374 B2* | 4/2009 | Martin et al. | ............ | 194/317 |
| 7,619,346 B2* | 11/2009 | Yazdi | ............ | 310/307 |
| 2001/0004236 A1* | 6/2001 | Letkomiller et al. | ............ | 340/572.1 |
| 2002/0036569 A1* | 3/2002 | Martin | ............ | 340/573.1 |
| 2002/0101769 A1* | 8/2002 | Garverick et al. | ............ | 365/200 |
| 2003/0009202 A1* | 1/2003 | Levine | ............ | 607/58 |
| 2003/0052781 A1* | 3/2003 | Iwasawa et al. | ............ | 340/556 |
| 2003/0133435 A1* | 7/2003 | Friedrich | ............ | 370/349 |
| 2004/0011194 A1* | 1/2004 | Lederer et al. | ............ | 92/5 R |
| 2004/0036626 A1* | 2/2004 | Chan et al. | ............ | 340/870.17 |

(Continued)

*Primary Examiner* — Benjamin C Lee
*Assistant Examiner* — Quang D Pham

(57) ABSTRACT

A radio frequency identification device having sensing elements incorporated in the clock generators of its tags, which generate a leading code and an identification code. In the interrogator, the leading code is detected and its pulse width is measured for calculating sensing values and the baud rate in receiving the identification code. No analog to digital converter is needed in digitizing sensing values and only discrete signals exist in sensing signal generation and communication. The tag device is insensitive to variations in its power supply voltage obtained from a continuous wave RF carrier.

16 Claims, 9 Drawing Sheets

U.S. PATENT DOCUMENTS

| | | | |
|---|---|---|---|
| 2004/0133790 A1* | 7/2004 | Hensley | 713/191 |
| 2004/0145474 A1* | 7/2004 | Schmidtberg et al. | 340/572.1 |
| 2004/0183572 A1* | 9/2004 | Bohl et al. | 327/110 |
| 2005/0137652 A1* | 6/2005 | Cauller et al. | 607/60 |
| 2005/0285726 A1* | 12/2005 | Haswell et al. | 340/445 |
| 2006/0114120 A1* | 6/2006 | Goldstone | 340/825.72 |
| 2006/0122473 A1* | 6/2006 | Kill et al. | 600/300 |
| 2006/0145881 A1* | 7/2006 | Sakatani et al. | 340/679 |
| 2006/0208880 A1* | 9/2006 | Funk et al. | 340/539.26 |
| 2007/0018837 A1* | 1/2007 | Mizutani et al. | 340/635 |
| 2007/0229228 A1* | 10/2007 | Yamazaki et al. | 340/10.34 |
| 2007/0229271 A1* | 10/2007 | Shionoiri et al. | 340/572.1 |
| 2007/0229281 A1* | 10/2007 | Shionoiri et al. | 340/572.7 |
| 2007/0285254 A1* | 12/2007 | Usami | 340/572.7 |
| 2008/0055047 A1* | 3/2008 | Osada et al. | 340/10.1 |
| 2008/0100435 A1* | 5/2008 | Jorgenson et al. | 340/539.22 |
| 2008/0129475 A1* | 6/2008 | Breed et al. | 340/438 |
| 2008/0136646 A1* | 6/2008 | Friedrich | 340/572.7 |
| 2008/0191866 A1* | 8/2008 | Falck et al. | 340/539.12 |
| 2008/0210762 A1* | 9/2008 | Osada et al. | 235/492 |
| 2008/0252254 A1* | 10/2008 | Osada | 320/108 |
| 2009/0243833 A1* | 10/2009 | Huang et al. | 340/505 |

* cited by examiner

RFID SENSOR DEVICE BASED ON PULSE-PROCESSING

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

FIELD OF THE INVENTION

This present application claims priority from U.S. provisional application No. 60/763,315 having the same tile as the present invention and filed on Jan. 30, 2006. This invention relates to radio frequency identification (RFID) devices, and more particularly, to RFID based sensors, the data acquired from which is read by an interrogator.

BACKGROUND OF THE INVENTION

Radio frequency identification devices generally comprise RF tags and a read-out device that is usually called interrogator or integration reader. The interrogator generates a continuous wave (CW) RF carrier that is used by the tag as a power source to modify the amplitude of the CW carrier by loading and unloading its antenna with stored digital codes. The modulated backscattering signals are then reflected back to the interrogator and demodulated, and thereby, the information stored in tags is read by the interrogator. RFIDs tags can be read through water, paint, dirt, wood, plastics, and human bodies. They are used broadly in security systems, electronic access cards, and inventory management systems.

RFIDs can also be used with sensors. In this application, typically, physical or chemical properties of an object, such as temperature, humidity, pressure, speed, pH, and acceleration, are detected as analog electrical signals. Then an Analog to Digital Converter (ADC) is employed to convert the analog signals into digital signals, which are read by the interrogator during a sampling cycle. Generally, an ADC compares the analog input voltage with a reference voltage in generating digital signals. Therefore, to obtain an accurate result, a high precision and stable reference voltage source is needed, and the variation of input voltage during sampling should be minimized. However, the power supply of RFID tags is usually generated by converting CW to direct current (DC). It is not easy to obtain a precise reference voltage without using an embedded battery cell. On the other hand, the signal sensing and A/D need extra power consumption, which needs a more powerful CW or closer operation range.

It is an object of the present invention to provide a RFID tag that is able to work with an interrogator to convert sensing values into digital signals without using A/D converters. Another object of the present invention is to provide a means to transmit the sensing information with identification (ID) codes.

BRIEF SUMMARY OF THE INVENTION

The invention provides a sensing device based on RFID technology. In this device, sensing elements are incorporated into RFID tags, and sensing information is sent back to the interrogator with ID codes. Typically, in RFID communication, only digital signals are transferred by loading and unloading tags' antenna under CW. Consequently, in using RFID with sensors, an ADC is normally employed to convert the analog signals to digital signals before they can be sent to the interrogator, since most sensors convert the physical or chemical properties of an object into analog electric signals. In the present invention, pulse width instead of analog voltage level is used for sensing the objects' physical or chemical properties through sensing elements. Since only discrete signals are used, they are easily sent with digital ID codes by the interrogator, and no ADC is needed. The digitalization of the sensing pulse signals is achieved in the interrogator instead of in tags when receiving the signals, i.e. the digitalization process is incorporated in data communication process, thereby no dedicated analog to digital conversion is needed and a faster and more power economical process can be realized.

In one embodiment of the present invention, the tag device includes an RC oscillator, the frequency of which is determined by a resistive sensor or a capacitive sensor. Through a logic control circuit, clock signals generated in the RC oscillator are used to trigger a data sequence including a leading code and an ID code. The width of pulses (leading pulses) in the leading code is a function of sensing values that changes with the resistance (or capacitance) of the sensor, and in the ID code, the sensor information, such as sensor type, sensor position and number, sensing baseline, and sensing range can be included for further data processing. The result code sequence is then sent out by the tag device through loading and unloading its antenna. In receiving the code, the interrogator device firstly digitizes the pulse width of the leading pulses, and then uses the results to calculate the baud rate for ID code communication. The sensing value is calculated after the communication is complete.

Another embodiment of the RFID tag device employs a LC oscillator for clock signal generation. The LC oscillator allows an inductive sensor to be used with the RFID tag device. As that in the RFID tag device using an RC oscillator, the pulse width of the leading pulses, which changes with the inductance or capacitance of the sensor, is used for determining the baud rate for the ID code communication. The sensing value is calculated by the interrogator after the ID code is read.

Features and advantages of the invention will be apparent from the following description of presently preferred embodiments, given for the purpose of disclosure and taken in conjunction with the accompany drawings.

DETAILED DESCRIPTION OF THE INVENTION

Figure 1:
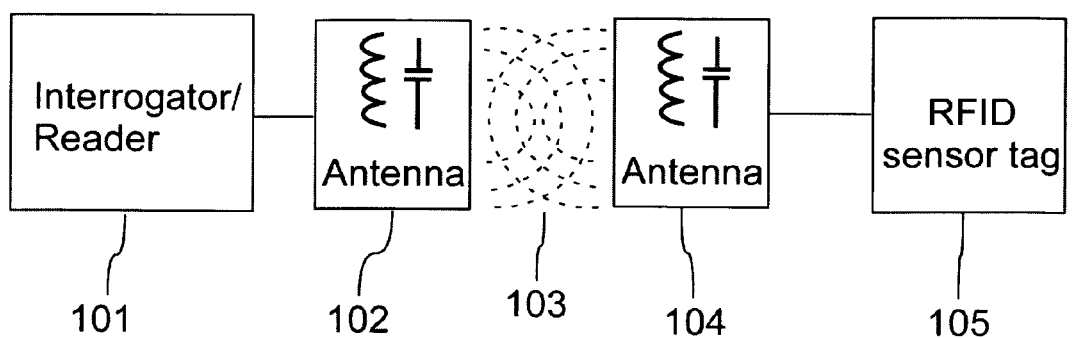
FIG. 1 is a block diagram of an RFID sensing system including a tag device and an interrogator device.

As depicted in FIG. 1, the RFID sensing system comprises an interrogator device 101 with an antenna 102 and an RFID sensor tag device 105 with an antenna 104. The RFID sensor tag device 105 has no internal power source. It gains power from a near field or far field RF 103 generated by the interrogator device 101. After the tag device 105 is powered, it then changes the amplitude of the RF carrier with a sequence of code stored inside the device. The change in amplitude is detected by the interrogator device 101 and therein the patterns in the amplitude change, which contain the code information, are examined. The demodulated code is used for further data processing.

Figure 2:
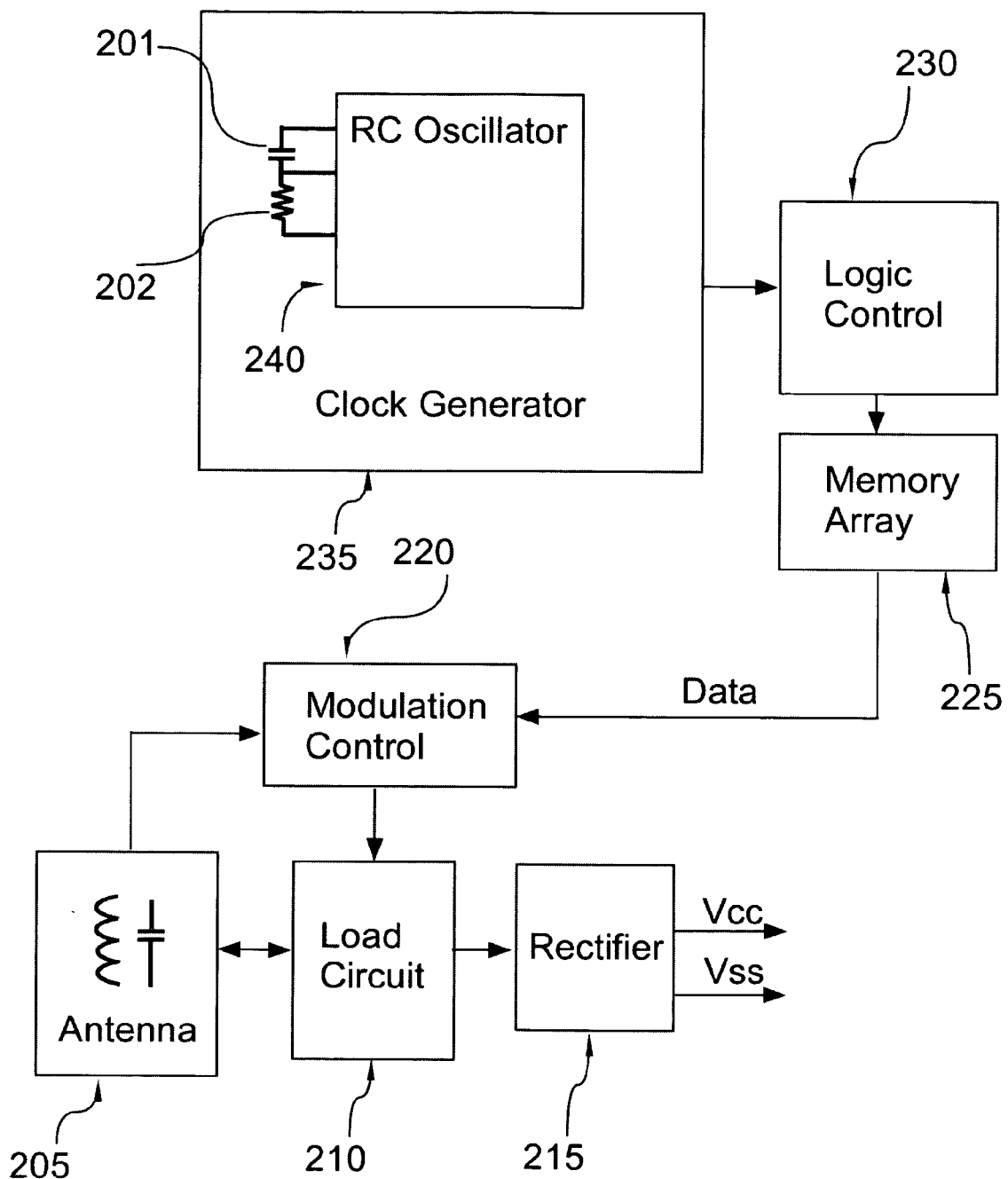
FIG. 2 illustrates a schematic block diagram of a RFID tag device using an RC oscillator as clock generator.

The block diagram of an embodiment of the RFID sensor tag device is shown in FIG. 2, in which, a clock generator 235, which includes an oscillator 240, is employed to provide a synchronous signal for a logic control block 230 to read the RFID code from a memory array 225. The RFID code is then encoded and modulated on the RF carrier signal obtained from an antenna 205 through a modulation control block 220 and a load circuit 210.

Figure 3:
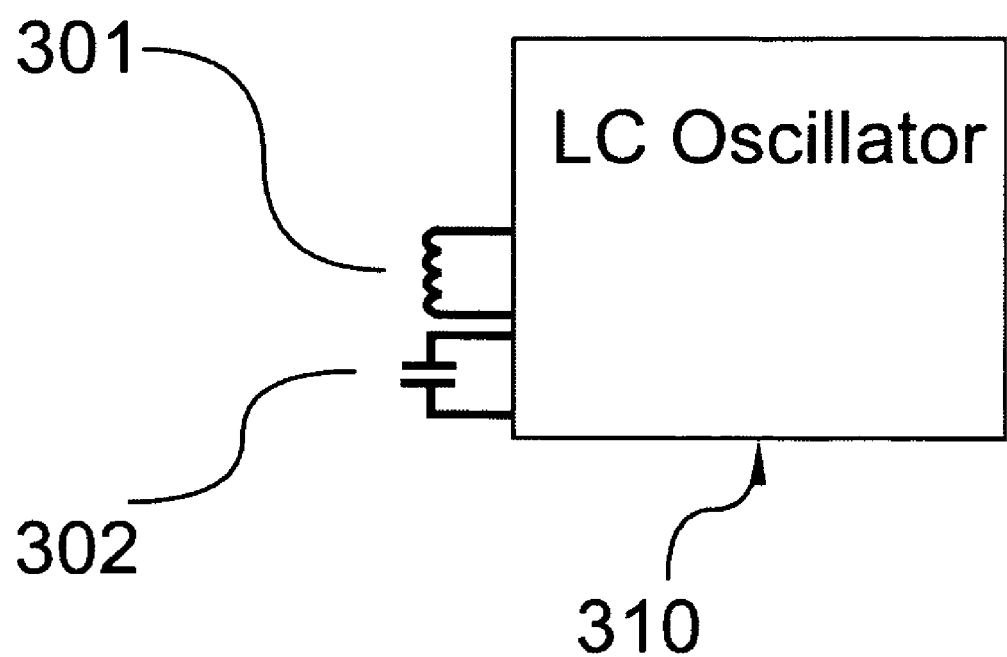
FIG. 3 is a schematic block diagram of an LC oscillator that allows an inductive sensor to be used in an RFID tag device.

The power supply is generated by a rectifier 215 from the carrier signals passing through the load circuit 210. The oscillator 240 in the embodiment shown in FIG. 2 is an RC oscillator with a capacitor 201 and a resistor 202. Sensing elements can be included in either the capacitor 201 or the resistor 202. For example, a capacitive humidity sensor can be used as the capacitor 201 or part of the capacitor 201 together with the resistor 202 in generating the clock signals. In addition to RC oscillators, LC oscillators can also be used for the clock generator 235. As shown in FIG. 3, the LC oscillator 310 includes an inductor 301 and a capacitor 302. The LC oscillators allow inductive sensors to be incorporated in the sensing circuit.

Figure 4:
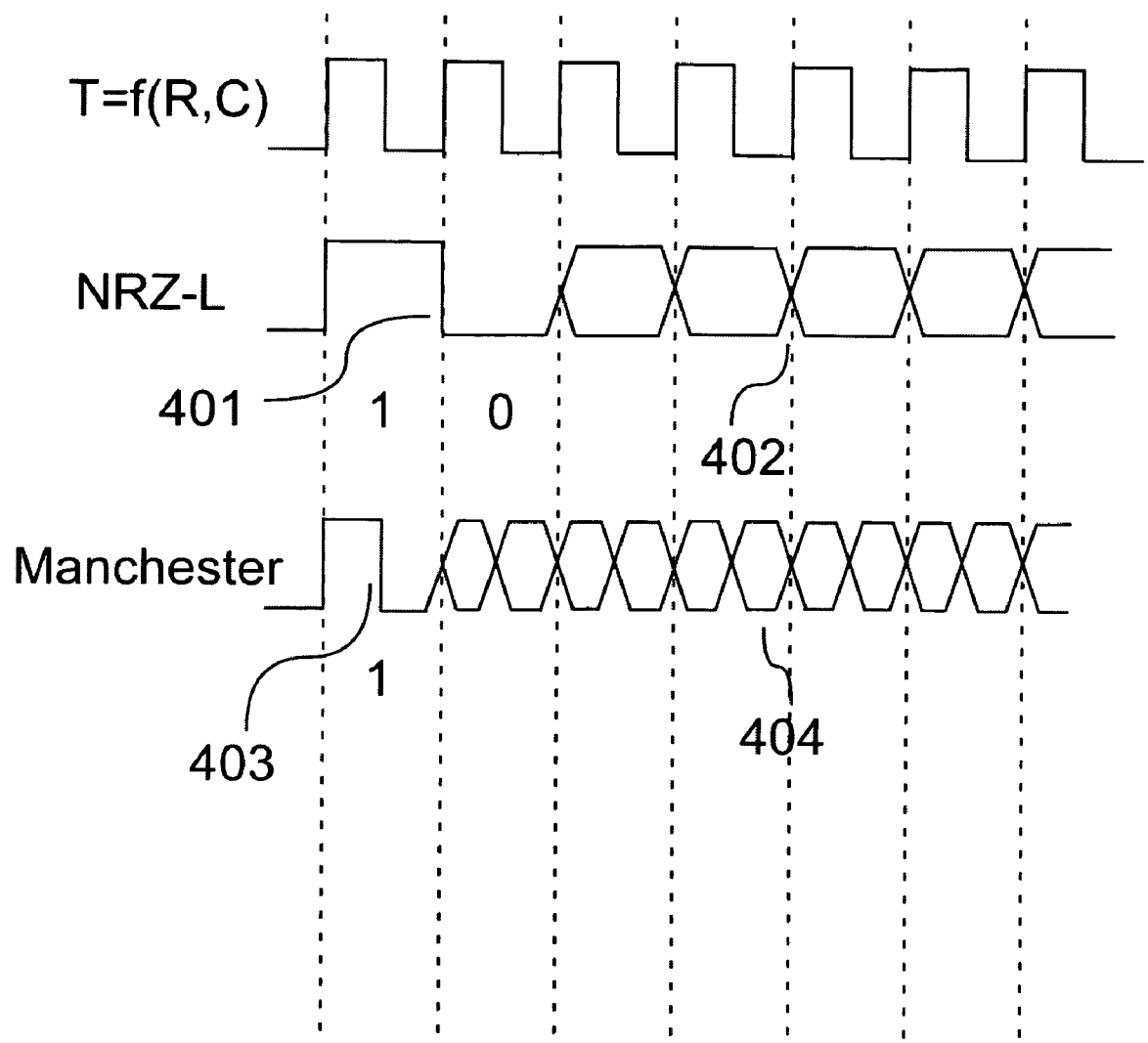
FIG. 4 is a timing chart for the code sequence including a leading code and an ID code.

The codes stored in the memory array 225 include two sections: the leading code, which includes at lease one pulse the width of which is determined by sensing values, and the ID code, which includes the ID of the tag. Since the clock frequency changes with sensing values, in communication, the baud rate is not constant. In the present invention, the baud rate is calculated for each communication by using the leading pulse width that is determined by sensing values. As depicted in FIG. 4, if NRZ-L code is used, a leading pulse 401 at least has two digits: 1 and 0. The pulse width $t_1$ of the digit 1 is determined by sensing values. The baud rate for the ID code 402 is $1/(2 t_1)$. When Manchester code is employed, the leading pulse 401 can be just one digit, 1. The pulse width $t_2$ of the digit 1 is determined by sensing values, and the baud rate of the ID code 404, different from that in NRZ-L code, is $1/t_2$.

Sensing values are obtained simultaneously in calculating the baud rate. As an example, if an RC oscillator is used (FIG. 2), the clock frequency is a function of the values of the resistor R and the capacitor C, f(R,C). When a capacitive humidity sensor is used as the capacitor, by measuring the width of the leading pulse, the capacitance and then the humidity value can be calculated using the equation $f(R,C)=1/T$, where T is the period time of the clock; $T=t_1$ if NRZ-L code is used, and $T=2 t_2$ when Manchester code is used. For example, if a linear RC oscillator is used, i.e., $f(R, C)=kRC$, where k is a coefficient in determining the frequency, then the capacitance C is calculated using $C=1/(kRT)$. Multi-leading pulses can be used for calculating average sensing values and the baud rate.

Figure 5:
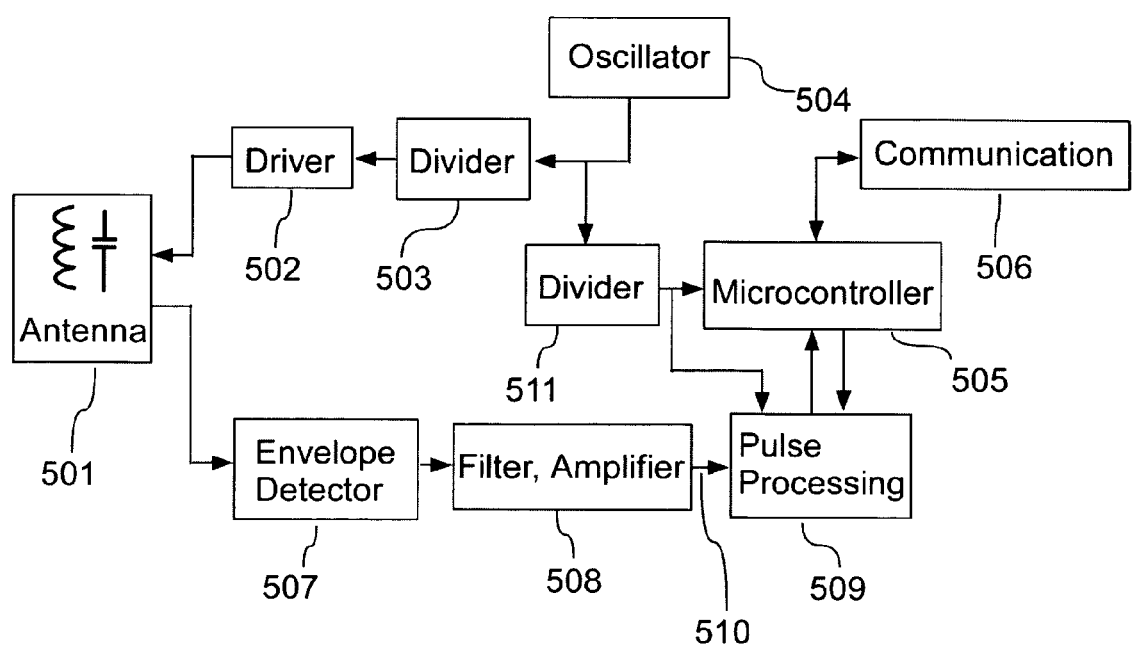
FIG. 5 shows a schematic block diagram of an RFID interrogator device.

As shown in FIG. 5, in the interrogator of the RFID system, signals acquired from an antenna 501 are sent to an envelope detector 507, where the code signals are separated from the carrier. The output signals from the envelope detector 507 pass through a filter and amplifier circuit 508. The result signals 510 are processed in a pulse-processing block 509, where the width of the leading pulse is digitized. A microcontroller 505 reads ID code based on baud rate calculated using the width of the leading pulse, and calculates the sensing value, while a circuit 506 is used for the communication between the microcontroller 505 and a host computer (not shown in the figure). The clock pulses for the microcontroller 505 and the pulse processing circuit 509 are provided by an oscillator 504 through a divider 511. RF carrier in the interrogator is generated by the oscillator 504 through a frequency divider 503 and a driver 502.

Figure 6A:
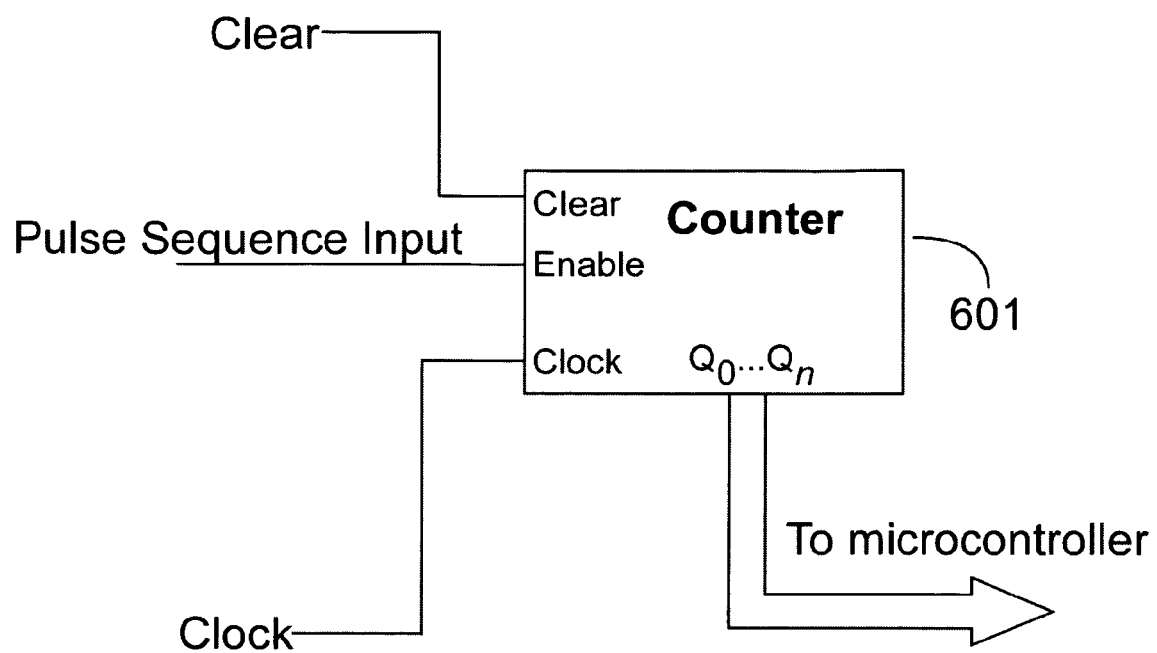
FIG. 6A shows a realization of the pulse processing block in FIG. 5.
Figure 6B:
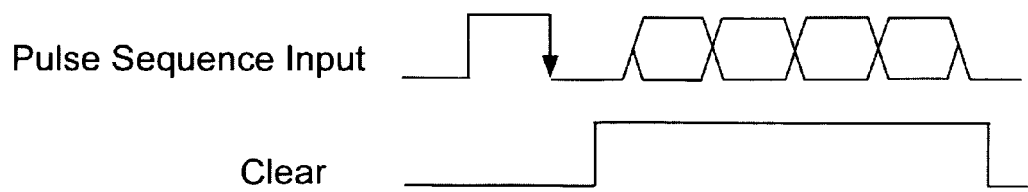
FIG. 6B is a timing chart for the pulse processing.
Figure 7:
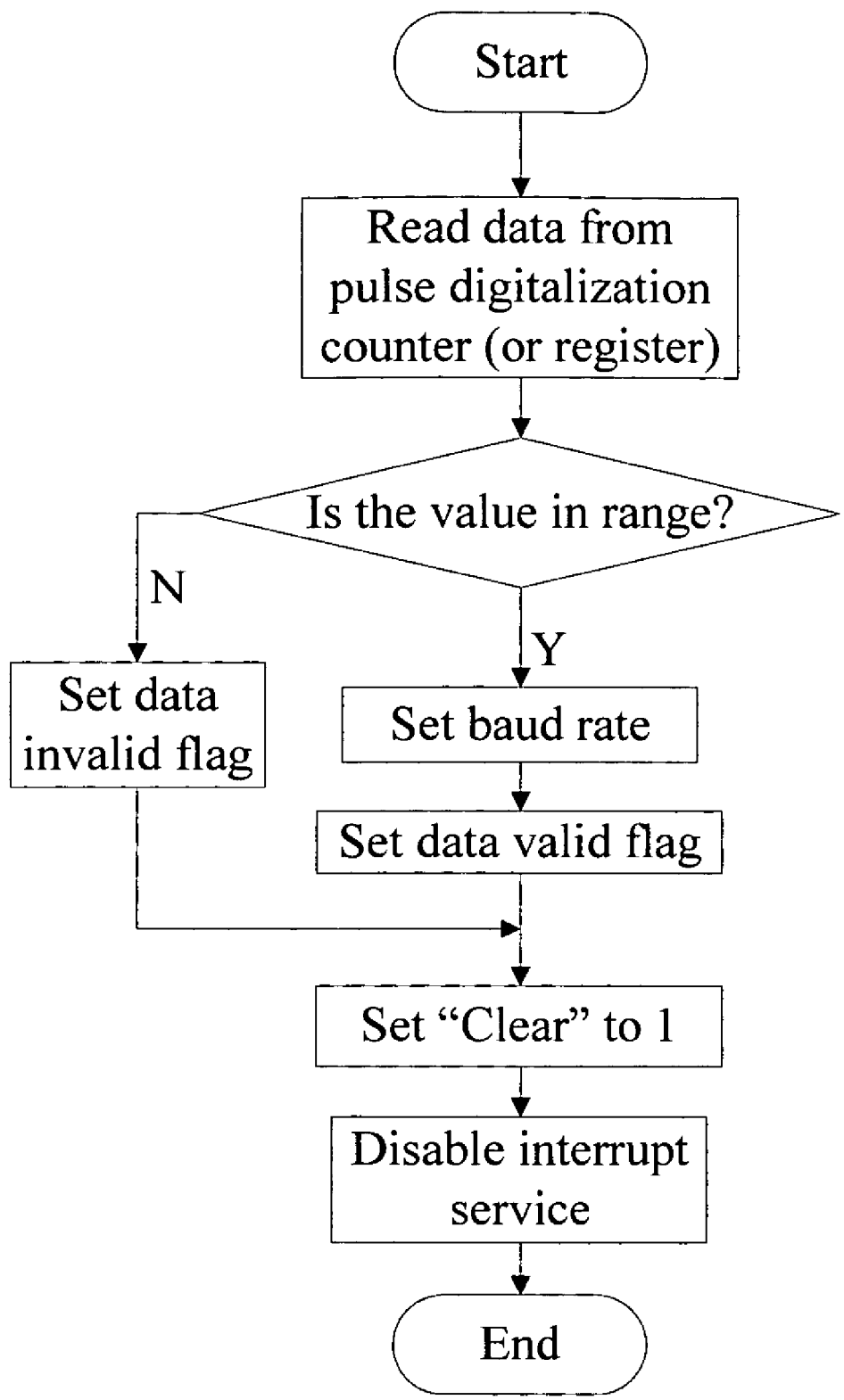
FIG. 7 is a flow chart of an interrupt service routine used for detecting leading pulses.

An example of the pulse-processing block 509 in the interrogator is shown in FIG. 6A, where it is realized by a counter 601. In the circuit, the Clear signal is provided by the microcontroller 505. The Pulse Sequence Input is the signal 510, and the Clock signal is generated by the oscillator 504 through a divider 511. The output signals Q0 to Qn of the counter 601 are sent to the microcontroller 505. Referring to the timing chart, which is shown in FIG. 6B, before pulses appear in the signal 510, the Clear signal is at low level. When a leading pulse is received, the high level signal enables the counter and the counting value at the falling edge of the leading pulse is its pulse width. An interrupt is trigged for the microcontroller 505 at the falling edge of the leading pulse when the counter is disabled. The microcontroller reads the counter value in the interrupt service routine and clears the counter for the next code reading. The flow chart for an interrupt service routine example is depicted in FIG. 7. When the interrupt service program starts, it first reads the counting value. Then according to the sensing range, the program judges if the counting value is in normal range. If it is within normal range, then a data valid flag is set and the counting value is used for calculating the sensing value and setting the baud rate for ID code communication. If the reading is out of normal range, then an invalid flag is set. The invalid flag will disable further communication until a counting value in normal range is detected. Before the interrupt service routine ends, the counter is cleared and disabled by setting the Clear signal to 1, and the leading pulse interrupt service is disabled (the leading pulse interrupt service will be enabled in the main routine when the interrogator is ready to receive another leading pulse or after the communication process is complete), so that it will not be triggered by the ID code pulses. In addition to an independent counter, the pulse processing can also be realized by using the microcontroller 505 directly based on timer interrupts. Some standard pulse measuring routines can be employed for digitizing the leading pulse width.

The ID code can be read through a standard serial communication program that uses a timer interrupt.

Figure 8:
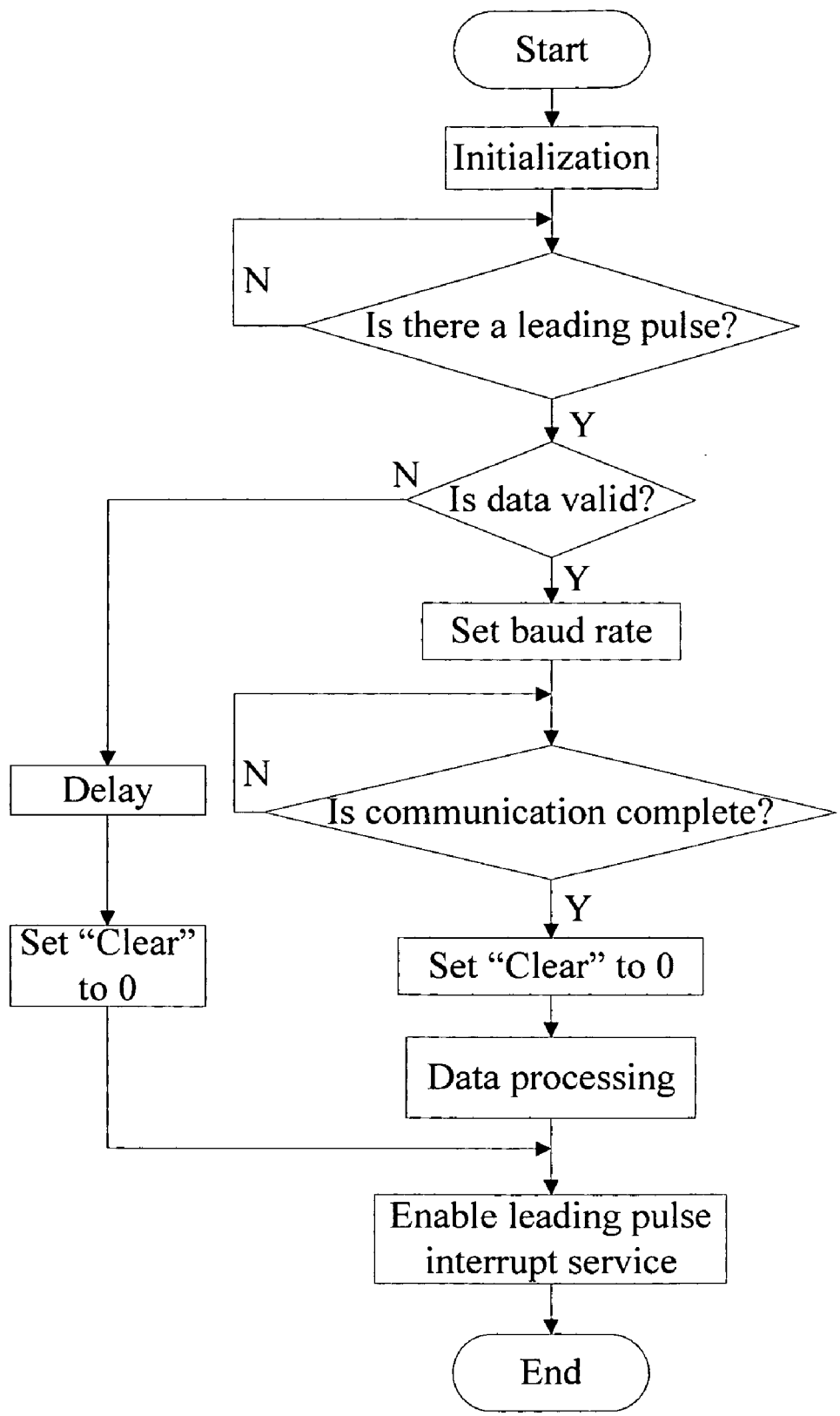
FIG. 8 is a flow chart of a main routine used by an RFID interrogator device.

The flow chart of a main routine example, in which only one pulse is included in the leading code, is shown in FIG. 8. During initialization, the leading pulse interrupt service is enabled, and then the program waits for a leading pulse to be detected by examining if the interrupt service is disabled (the interrupt service is disabled after a leading pulse is detected). When a leading pulse is detected and a data valid flag is set, the baud rate then is calculated based on the width of the leading pulse and an ID code communication starts, otherwise, if a leading pulse and a data invalid flag are detected, after a delay, the program will enable the pulse-processing counter 601 by setting the Clear (FIG. 6A) to 0, and enables the leading pulse interrupt service for next communication. After the ID code communication is complete, the program sets the Clear (FIG. 6A) to 0 to enable the pulse-processing counter 601, and the sensing value is calculated during data processing. Before the program ends, the leading pulse interrupt service is enabled for next communication.

The invention claimed is:

1. A radio frequency identification tag device, comprising:
   a clock generator having at least one sensing element incorporated for generating a clock signal with frequency changing with sensing values obtained from said at least one sensing element;
   a logic circuit that generates a mixed code sequence by serially connecting a serial ID code to a leading code having at least one sensing pulse, the baud rate of said serial ID code and the width of said at least one sensing pulse change with the frequency of said clock signal generated by said clock generator;
   a radio frequency tuned circuit; and
   a circuit for loading and unloading said radio frequency tuned circuit with said mixed code sequence.

2. The radio frequency identification tag device according to claim 1, wherein said clock generator is an RC generator.

3. The radio frequency identification tag device according to claim 2, wherein said RC generator includes a resistive sensor.

4. The radio frequency identification tag device according to claim 2, wherein said RC generator includes a capacitive sensor.

5. The radio frequency identification tag device according to claim 1, wherein said clock generator is an LC generator.

6. The radio frequency identification tag device according to claim 5, wherein said LC generator includes an inductive sensor.

7. The radio frequency identification tag device according to claim 5, wherein said LC generator includes a capacitive sensor.

8. The radio frequency identification tag device according to claim 1, wherein said logic circuit includes a memory array.

9. The radio frequency identification tag device according to claim 8, wherein said serial ID code is generated using data stored in said memory array.

10. The radio frequency identification tag device according to claim 1, wherein said ID code includes information about said at least one sensing element in said clock generator.

11. A radio frequency interrogator device, comprising a circuit that detects a mixed code sequence generated by a radio frequency identification tag device, said mixed code sequence is generated by serially connecting a serial ID code to a leading code having at least one sensing pulse, and the baud rate of said serial ID code and the width of said at least one sensing pulse change with the frequency of a clock signal generated by a clock generator, wherein said clock generator has at least one sensing element incorporated for generating said clock signal with frequency changing with sensing values obtained from said at least one sensing element;
   a pulse processing unit for measuring the width of said at least one sensing pulse in said leading code;
   a communication unit that obtains said ID code with the baud rate calculated using the pulse width measured by said pulse processing unit; and
   a sensing value processing unit that calculates sensing values using said ID code obtained with said communication unit and the pulse width measured by said processing unit.

12. The radio frequency interrogator device according to claim 11, wherein said pulse processing unit includes a counter.

13. The radio frequency interrogator device according to claim 11, further comprising a microcontroller.

14. The radio frequency interrogator device according to claim 13, wherein said pulse processing unit includes a routine in said microcontroller.

15. The radio frequency interrogator device according to claim 13, wherein said sensing value processing unit includes a routine in said microcontroller.

16. A system for identifying and reading a sensor value, comprising:
   at least one radio frequency identification tag device including a clock generator having at least one sensing element incorporated for generating a clock signal with frequency changing with sensing values obtained from said at least one sensing element, a logic circuit that generates a mixed code sequence which includes by serially connecting a serial ID code to a leading code having at least one sensing pulse, and the baud rate of said serial ID code and the width of said at least one sensing pulse change with the frequency of said clock signal generated by said clock generator, a radio frequency tuned circuit, and a circuit for loading and unloading said radio frequency tuned circuit with said mixed code sequence;
   a radio frequency interrogator device having a circuit that detects said mixed code sequence generated by said at least one radio frequency identification tag device, a pulse processing unit for measuring the width of said sensing pulse in said leading code, a communication unit that obtains said ID code with the baud rate calculated using the pulse width measured by said pulse processing unit, and a sensing value processing unit that calculates sensing values based on said ID code obtained with said communication unit and the pulse width measured by said pulse processing unit.

* * * * *